INVENTORS
WILLIAM H. BARKOW &
ROY M. CHRISTENSEN
BY
William H. Meagher
Attorney

INVENTORS
WILLIAM H. BARKOW &
ROY M. CHRISTENSEN
BY William H. Meagher
Attorney

INVENTORS
WILLIAM H. BARKOW &
ROY M. CHRISTENSEN
BY William H. Meagher
Attorney

INVENTORS
WILLIAM H. BARKOW &
ROY M. CHRISTENSEN
BY William H. Meagher
Attorney

INVENTORS
WILLIAM H. BARKOW &
ROY M. CHRISTENSEN
BY
William H. Meagher
Attorney

United States Patent Office 3,329,861

Patented July 4, 1967

3,329,861

DYNAMIC RASTER DISTORTION CORRECTION CIRCUIT HAVING FOUR WINDOW MAGNETIC CIRCUIT

William H. Barkow, Pennsauken, and Roy M. Christensen, Princeton Junction, N.J., assignors to Radio Corporation of America, a corporation of Delaware Filed Aug. 31, 1964, Ser. No. 393,249
16 Claims. (Cl. 315—24)

This invention relates to circuit arrangements for providing electromagnetic deflection of an electron beam in a cathode ray device of a television apparatus. The invention relates more particularly to a circuit arrangement for reducing distortions occurring in a raster being formed on a target of the device by a scanning electron beam.

In a television apparatus having means for electromagnetically deflecting an electron beam in a cathode ray device, a deflection yoke is positioned about a neck of the device and circuit means cause cyclically varying currents to flow in deflection windings of the yoke. A varying electromagnetic field, which is thereby generated, deflects the electron beam and forms a raster on a target of the device. In general, the raster which is formed is desirably rectangular in shape. However, various types of electron beam scanning distortions such as pincushion, barrel, keystone, and linearity distortion occur and cause the generated raster configuration to deviate from the desired rectangle.

It is an object of this invention to provide a novel circuit arrangement which is adapted for correcting the referred-to forms to raster distortion.

The present invention is particularly suitable for reducing pincushion and barrel distortion. This type of distortion is characterized by a retraction or extension of a center segment of a side of the raster with respect to corner segments of the same side. The retraction or extension is typically hyperbolically or parabolically shaped. This distortion results partly from the physical geometry of the deflection system as determined by such factors as the size and configuration of the target area and the relative position of an electron beam deflection center with respect to the target and partly from the electrical properties of the deflection windings.

Various arrangements have heretofore been provided in the art for correcting pincushion and barrel distortion. In certain apparatus, static correction is adequate and is generally accomplished by establishing a nonvarying magnetic correction field for providing in cooperation with a varying electromagnetic field a resultant magnetic field adapted for correcting the raster distortion. However, in other apparatus such as television receiving apparatus utilizing relatively wide-angle and/or multi-beam cathode ray devices, a spot distortion which is characterized by a defocusing of the beam spot at a target of the cathode ray device occurs and a static correction means is not suitably effective in providing the correction desired. In the latter type of apparatus, the art has provided a dynamic form of correction circuit.

A known form of dynamic correction circuit arrangement includes a variable inductive impedance coupled to a deflection winding of the yoke for cyclically altering the amplitude of the cyclical deflection current. The correction circuit is adapted for automatically varying the inductive impedance during beam deflection and correspondingly altering deflection current in a manner for reducing pincushion or barrel distortion. Since the inductive impedance varies, the deflection winding and inductive impedance thus appear to a driving circuit as a load of varying impedance. In certain television apparatus, the driving circuit does not represent either a constant voltage or constant current source and it is thus disadvantageous to utilize a load of varying impedance with the apparatus. For example, in a horizontal deflection section of a television receiving apparatus, various other circuits in the receiver such as a power supply for providing a relatively high electron beam accelerating voltage and a B-boost power supply, derive their electrical operating energy from stored energy in the deflection output circuit. As the inductive impedance is altered to provide raster correction, the stored energy of the output circuit is correspondingly altered. This change in stored energy is generally accompanied by undesirable variations in the operating characteristics of these other circuits.

It is another object of this invention to provide an improved, dynamic, raster correction circuit arrangement for a television apparatus.

Another object of this invention is to provide a television receiving apparatus having automatically variable inductive impedance means for correcting raster distortions of the type referred to, yet one which presents a substantially constant load to an output deflection circuit of the apparatus.

In prior television apparatus employing a regulated form of high accelerating voltage power supply, it has been impractical and relatively difficult to provide raster correction for distortions of the type referred to.

Still another object of the invention is to provide a raster correction circuit arrangement for use with a television apparatus utilizing a form of regulated high voltage power supply.

In accordance with the present invention, an electromagnetic deflection system for a television apparatus includes an electron beam deflection winding, circuit means for causing a cyclical deflection current to flow in the winding, and dynamic raster correction means coupled to the deflection winding for varying the cyclical deflection current amplitude in a manner for correcting the raster distortion while presenting a load of substantially constant impedance to the driving circuit. The raster correcting means includes a first impedance coupled in series with the deflection winding, a second impedance coupled in parallel with the deflection winding, and means for causing these impedances to automatically and simultaneously vary in magnitude in an opposite manner during deflection of the electron beam. By this arrangement, the deflection winding current is varied in a manner for providing raster distortion correction while the loading on the cyclical current source is maintained substantially constant.

These and other objects of the invention will become apparent with reference to the following specification and drawings wherein.

Figure 1:
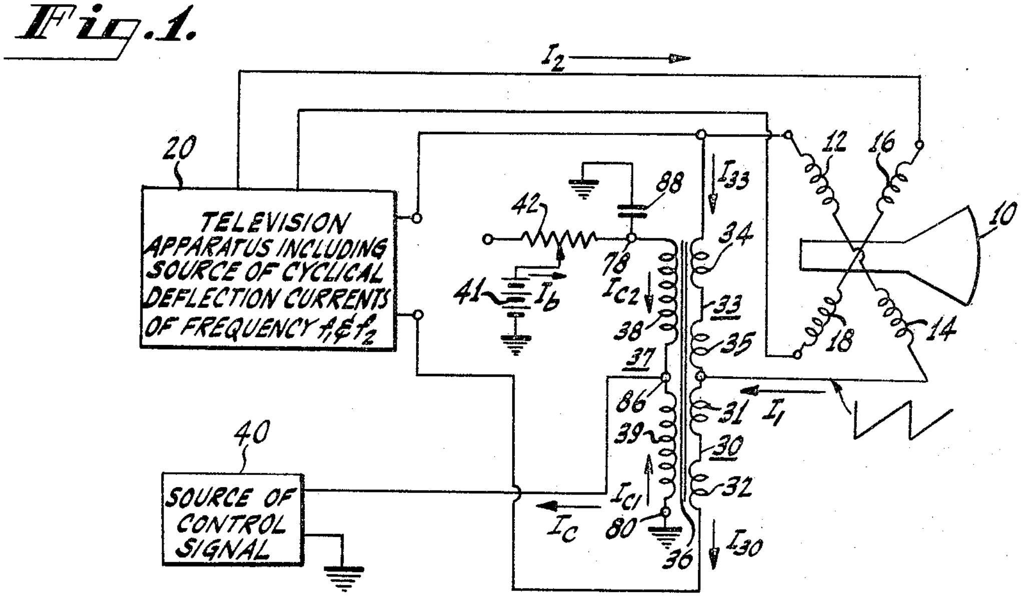
FIGURE 1 is a circuit diagram, partly in block and partly in schematic form, of a television apparatus utilizing an embodiment of the present invention.

In FIGURE 1, a television apparatus which comprises a television broadcasting or receiving apparatus is shown to include a cathode ray device 10, deflection windings 12 and 14 for deflecting an electron beam of the device 10 in a first direction, deflection windings 16 and 18 for deflecting the electron beam in a second direction, and conventional circuit means represented by the block 20 for causing a cyclical current $I_1$ of frequency $f_1$ to flow in the windings 12 and 14 and a cyclical current $I_2$ of frequency $f_2$ to flow in the windings 16 and 18. These currents generate varying electromagnetic fields for deflecting the electron beam in a scanning raster on a target of the device 10.

Figure 2A:
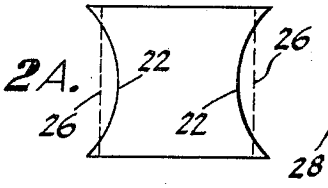
FIGURES 2A and 2B are diagrams illustrating rasters having pincushion and barrel distortion respectively.
Figure 2B:
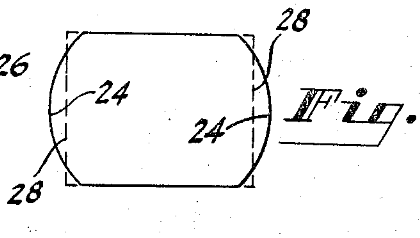

As indicated hereinbefore, various factors create distortions in the raster configuration which is formed. Although the following detailed discussion relates particularly to pincushion and barrel correction, keystone and linearity distortions may also be corrected with the modifications indicated hereinafter. FIGURE 2A illustrates a raster having pincushion distortion in one direction while in FIGURE 2B, a raster having barrel distortion in one direction is shown. The characteristic pincushion retraction of a center portion of a side segment with respect to corner segments of the same side is indicated by the sides 22 in FIGURE 2A while the characteristic barrel extension of a center portion of a side segment with respect to corner segments of the same side is indicated by the sides 24 in FIGURE 2B. It is desirable that the raster have a generally rectangular shape and that the sides 22 and 24 of the rasters of FIGURES 2A and 2B respectively coincide with the dotted lines 26 and 28. As indicated previously, it is also desirable that, in correcting this raster distortion, the loading on the deflection current source 20 remains substantially constant.

In providing these functions, a first impedance, indicated generally in FIGURE 1 as an inductance 30 having windings 31 and 32, is coupled in series with the deflection windings 12 and 14 and a second impedance, indicated generally as an inductance 33 having windings 34 and 35, is coupled in parallel with the deflection windings 12 and 14. Although the windings 31 and 32 of inductance 30 and the windings 34 and 35 of inductance 33 are shown coupled in series in FIGURE 1, they may equally well be coupled in parallel. Means for varying the magnitude of these impedances include a magnetic circuit formed by a body of magnetic material 36 and a flux control winding indicated generally as 37 and including separate windings 38 and 39. A flux control current $I_c$ (FIGURE 3), which is derived from a source 40, flows in the control winding 37 the separate windings 38 and 39 of which are connected in parallel for the control current $I_c$. Alternatively, the windings 38 and 39 may be coupled in series for the control current $I_c$. Means for establishing a bias flux in the body 36 is provided. A direct current $I_b$, for establishing this bias flux is derived from a source 41 of direct current potential and flows through a variable resistance 42 to the control winding 37. Permanent magnet means may also be utilized for establishing the desired bias flux.

Figure 3:
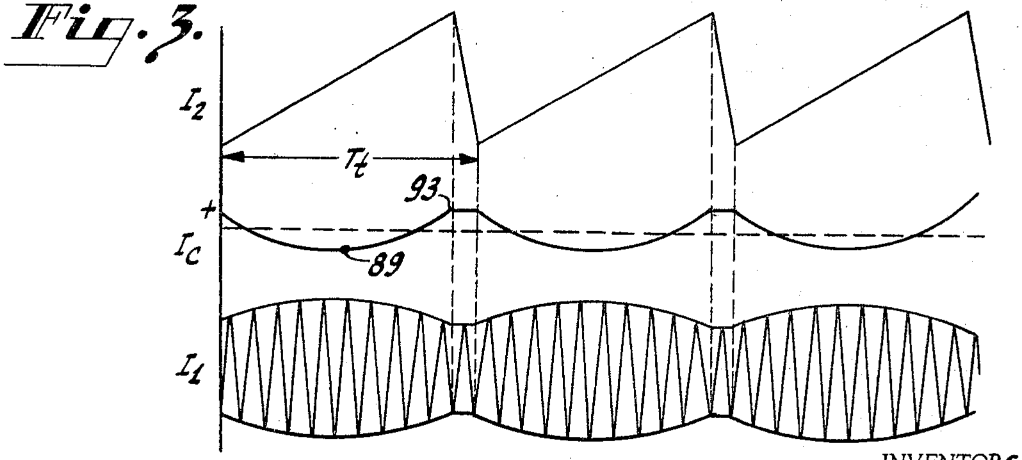
FIGURE 3 is a diagram of various waveforms of current occurring in the apparatus of FIGURE 1.

As described in greater detail hereinafter, the current $I_b$ establishes a bias flux in the body 36 while the current $I_c$ causes the magnitude of a resultant flux in segments of the body 36 associated with the windings of the inductances 30 and 33, to vary in an opposite manner (i.e., magnetically opposing each other). The permeability of these segments and thus the impedances provided by the inductances 30 and 33 are thereby caused to vary in magnitude in an opposite manner. That is, as the magnitude of impedance 30 decreases, the magnitude of impedance 33 increases. Conversely, the magnitude of impedance 30 will increase when the magnitude of impedance 33 decreases. This impedance variation operates to provide a deflection current $I_1$ having the modulation envelope illustrated in FIGURE 3. Alternatively, in effecting barrel correction, the waveform of control current $I_c$ of FIGURE 3 is inverted to provide a corresponding inverted modulation envelope of current $I_1$. Because the envelope of current $I_1$ is varied in a parabolic fashion during a trace interval $T_t$ as shown in FIGURE 3, an electron beam which is being deflected in the first direction by the current $I_1$ is deflected greater distances near a center segment of a raster side and lesser distances near the extremities of a side of the raster. The correction circuit provides this variation in deflection current amplitude by causing the inductance 30 to automatically increase in magnitude and the inductance 33 to decrease in magnitude as the electron beam is deflected near the extremities of the raster. Conversely, the inductance 30 decreases in magnitude while the inductance 33 increases in magnitude as the electron beam is deflected in the area of the center portion of the raster. Since the first and second inductances vary in an opposite manner the loading of the cyclical current source 20 can be maintained substantially constant by suitably proportioning these changes in inductance.

Figures 4, 5, 6A, 6B, 7A, 7B, 8A, 8B:
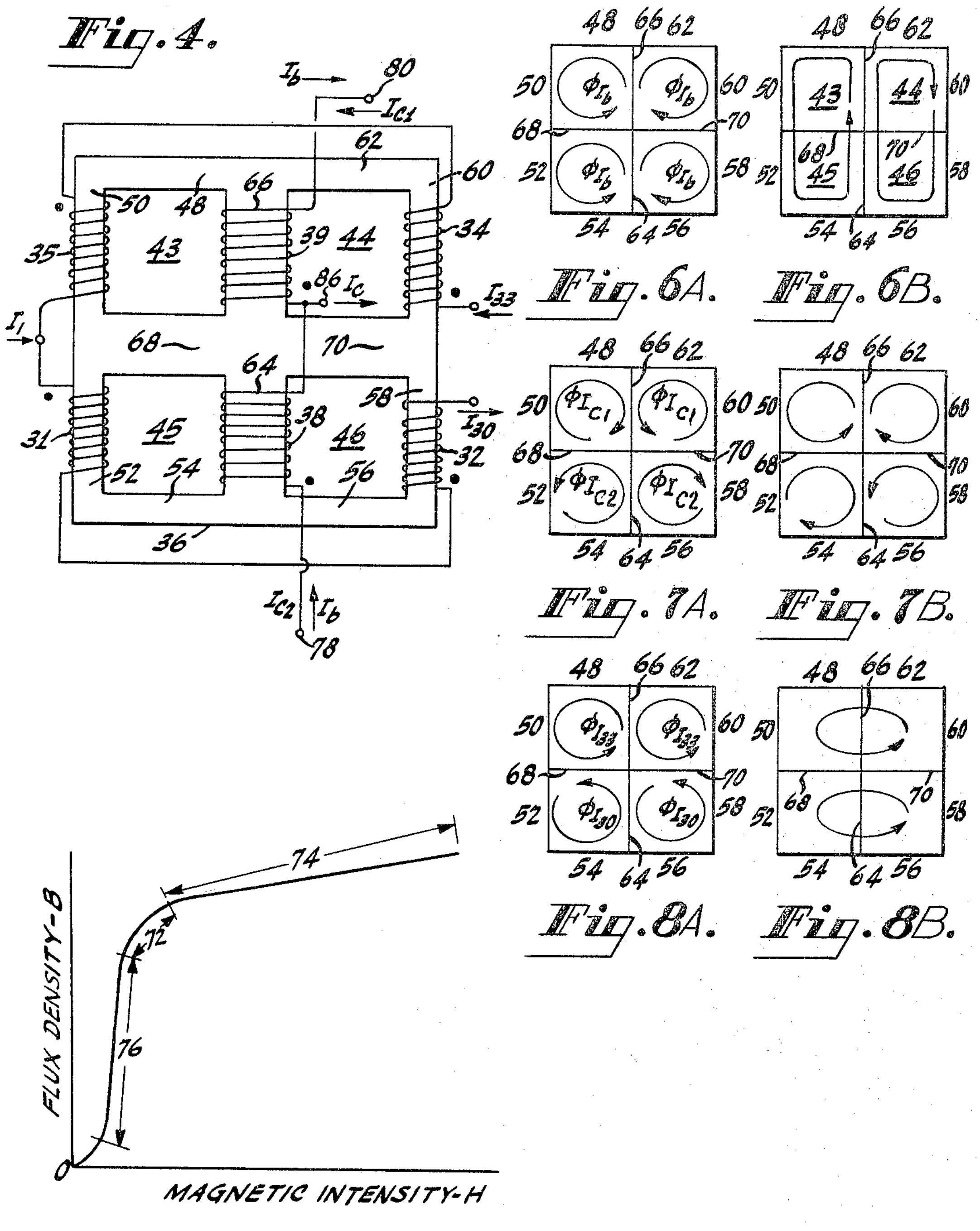
FIGURE 4 is a diagram of a reactor utilized in the embodiment of the invention illustrated in FIGURE 1.
FIGURE 5 is a diagram of a magnetization characteristic of the material from which the reactor of FIGURE 4 is fabricated.
FIGURES 6A and 6B are diagrams illustrating a magnetic bias flux flowing in segments of the reactor of FIGURE 4.
FIGURES 7A and 7B are diagrams illustrating a control current magnetic flux flowing in segments of the reactor of FIGURE 4.
FIGURES 8A and 8B are diagrams illustrating a deflection current magnetic flux flowing in segments of the reactor of FIGURE 4.

The manner in which the inductances 30 and 33 of FIGURE 1 are automatically varied to provide the desired raster correction is best explained with reference to FIGURES 4 through 10. In FIGURE 4, the body of magnetic material 36 is shown to comprise a structure having segments defining a four-window magnetic circuit including a first window 43, a second window 44, a third window 45, and a fourth window 46. Window segments forming a perimeter for the body 36 and which are independent of segments of adjacent windows are indicated by reference numerals 48, 50, 52, 54, 56, 58, 60 and 62. Segments of the body 76 which are common to adjacent windows are indicated by reference numerals 64, 66, 68 and 70. The windings 31 and 32 of the inductance 30 are positioned about body segments 52 and 58 respectively and are polarized as indicated by the dots in FIGURE 4. The windings 34 and 35 of inductance 33 are positioned about body segments 60 and 50 respectively and are polarized as indicated in FIGURE 4. Individual windings 38 and 39 of control winding 37 are positioned about the common window segments 64 and 66 respectively and are polarized as indicated in FIGURE 4. The polarization symbol (·) indicates the relationship between current flow and magnetic flux resulting therefrom. By this convention, current flowing into and end of a winding which is so marked establishes lines of magnetic flux which enter the winding at the same marked end and exit from the winding at an opposite end.

The magnetic circuit and windings of FIGURE 4 form a reactor which utilizes the magnetic characteristic of a ferromagnetic material, from which the body 36 is fabricated, for varying the magnitude of the inductances 30 and 33. A magnetic characteristic of a suitable ferromagnetic material is illustrated by the magnetization curve of FIGURE 5 wherein magnetic flux density B is plotted against magnetic intensity H. The magnetization curve includes a knee segment 72, a saturation segment 74 extending through a region of relatively low permeability and a segment 76 extending through a region of relatively high permeability. A region through which the knee segment 72 extends represents a transition region wherein the permeability of the material decreases from its relatively high values at segment 76 to relatively low values along segment 74. The previously referred-to independent window segments of the body 36 are biased by the current $I_b$ in the area of the knee segment 72 of the magnetization curve. The control current $I_c$ causes the magnetization state of those window segments associated with the inductance 30 and those window segments associated with the inductance 33 to deviate in mutually opposite directions from the bias point along the magnetization curve. The permeability of these segments therefore varies in an opposite manner and causes a corresponding variation in the magnitude of the inductances 30 and 33.

Figure 9:
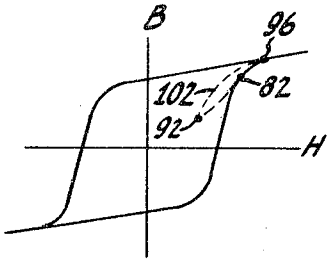
FIGURE 9 is a hysteresis curve of a segment of the reactor of FIGURE 4.
Figure 10:
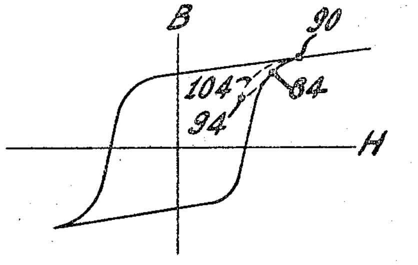
FIGURE 10 is a hysteresis curve of another segment of the reactor of FIGURE 4.

The following explanation indicates, in greater detail, the operation of one form of the reactor. The physical configuration of the body 36 provides for common window segments 64 and 66 each having substantially the same cross sectional area $A_1$ and for independent window segments each having substantially the same cross sectional area $A_2$ which is less than the area $A_1$. The separate control windings 38 and 39 are adapted to establish magnetic fields of equal magnetic intensity H when a current of equal amplitude flows therein. In FIGURES 1 and 4, the bias current $I_b$ flows into a terminal 78 of the winding 38, through the winding 38, through the winding 39 and from a terminal 80 thereof. FIGURE 6A illustrates the lines of flux which are established in four separate magnetic paths by the bias current $I_b$ while FIGURE 6B illustrates the resultant bias flux established in the body 36 by this current. The resultant flux is shown to flow counterclockwise in a magnetic circuit formed by the segments of windows 43 and 45 and clockwise in a magnetic circuit formed by the segments of windows 44 and 46. In FIGURE 9, a hysteresis curve for the segments 50 or 60 of the inductance 33 is illustrated while a hysteresis curve for the segments 52 or 58 of inductance 30 is illustrated in FIGURE 10. The source of D.-C. potential 41 and the resistance 42 of FIGURE 1 provide a bias current $I_b$ in the windings 38 and 39, having a magnitude which causes a flux in segments 50 and 60, represented by the point 82 in the FIGURE 9, and a flux bias in the segments 52 and 58, represented by the point 84 in FIGURE 10. The points 82 and 84 are in the region represented by the knee segment 72 in the magnetization curve of FIGURE 5.

The separate windings 38 and 39 of the control winding 37 are arranged in parallel for the control current $I_c$. A first component of this control current $I_{c1}$ flows between the source 40 (FIGURE 1) and the control winding via a circuit including a ground circuit, the terminal 80, the winding 39, and a terminal 86. A second component of this current $I_{c2}$ flows between the source 40 and the control winding via a circuit including the ground circuit, a capacitor 88, the terminal 78, the winding 38, and the terminal 86. These components of the current $I_c$ generate lines of flux in segments of the body 36, as illustrated in FIGURE 7A, when a negative alternation of a cycle of control current (FIGURE 3) occurs. The magnetic intensity H established by the components $I_{c1}$ and $I_{c2}$ will vary in accordance with the waveform of control current $I_c$ and the flux density will vary in accordance with the hysteresis characteristic of the body 36. During a positive alternation of the control current cycle (FIGURE 3), the direction of the flux lines of FIGURE 7A will reverse, as shown in FIGURE 7B, and the magnetic intensity H similarly varies in accordance with the positive alternation of the waveform of control current.

The flux lines established by the bias current $I_b$ and by the components of the control current combine and cause the permeability of the segments 50 and 60 and the segments 52 and 58 to vary during the period $T_t$. When the current $I_c$ flows out of the terminal 86 as shown in FIGURES 1 and 4, and, in accordance with the winding convention adopted, the resultant flux density in segments 52 and 58 increases while the flux in segments 50 and 60 decreases. As the control current $I_c$ attains a maximum amplitude during this negative alternation as represented by the point 89 on the waveform of FIGURE 3, the flux density in segments 52 and 58 has increased to a maximum value such as represented by a point 90 on the hysteresis diagram of FIGURE 10 while the flux density of segments 50 and 60 has decreased to a minimum value such as represented by a point 92 on the hysteresis diagram of FIGURE 9. During the positive alternation of control current, the current $I_c$ flows into terminal 86 and the resultant flux density in segments 52 and 58 decreases while flux density in segments 50 and 60 increases. As the current $I_c$ attains a maximum value such as represented by the point 93 on the waveform of FIGURE 3, the flux density in segments 52 and 58 decreases to a minimum value such as represented by a point 94 on the hysteresis diagram of FIGURE 10 while the flux density in segments 50 and 60 increases to a maximum value represented by a point 96 on the hysteresis diagram of FIGURE 9. For values of the control current intermediate the maximum amplitudes 89 and 93, the flux density of the segments 50 and 60 varies in accordance with a minor hysteresis loop such as 102 of FIGURE 9 while the flux density of segments 52 and 58 varies in accordance with the minor hysteresis loop such as 104 of FIGURE 10. The permeability of the segments 52 and 58 and the permeability of the segments 50 and 60 thus vary in an opposite manner during the cycle $T_t$ and cause the impedances presented by the inductances 30 and 33 to vary accordingly.

The source 20 of cyclical current $I_1$ causes a current $I_{33}$ to flow in the windings 34 and 35 and a current $I_{30}$, where $I_{30}=I_{33}+I_1$, to flow in the windings 31 and 32. These currents cause a corresponding flux to be established in segments of the body 36. The windings 31, 32, 34 and 35 are polarized as indicated in FIGURE 4 and cause the flux to flow in the same direction through each winding. Flux lines created by these currents in the segments of the body are illustrated in FIGURE 8A while the resultant flux in segments of the body is illustrated in FIGURE 8B. The currents $I_{30}$ and $I_{33}$ cause a wobble in the bias points 82 and 84 on the hysteresis curves of FIGURES 9 and 10 but are ineffective in disturbing the desired operation.

Various parameters of the reactor of FIGURE 4 may be altered in order to attain the desired variations in the inductances 30 and 33. For example, the cross sectional area of the body segments, the number of turns in the windings, and the magnitude of the currents $I_b$ and $I_c$ are parameters which may be varied to attain these results. Although a four-window arrangement of the ferromagnetic body has been described, other arrangements of the body may be utilized. For example, a first ferromagnetic body may be employed to form a two-window magnetic circuit having windows 43 and 44 and a second ferromagnetic body may be utilized to form a two-window magnetic circuit having the windows 45 and 46.

Figure 11:
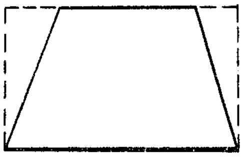
FIGURE 11 is a diagram illustrating a raster having keystone distortion.
Figure 12:
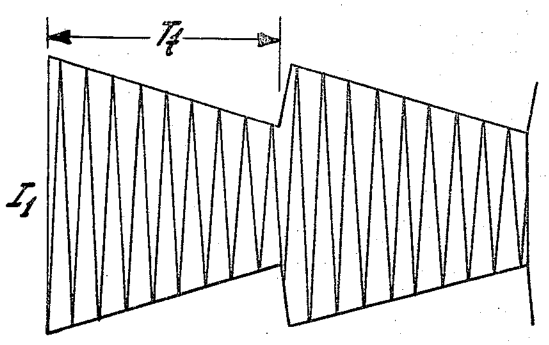
FIGURE 12 is a diagram illustrating the modulation envelope of deflection current adapted for correcting the keystone distortion of FIGURE 11.

FIGURE 11 illustrates a raster having keystone distortion in one direction. The raster correction circuit arrangement of FIGURE 1 can be modified to correct keystone distortions by providing a source 40 for applying to the control winding 30 a control current having a sawtooth waveform. The envelope of the current $I_1$ of FIGURE 3 is thereby modified as illustrated in FIGURE 12 to provide the raster correction for the keystone distortion shown in FIGURE 11.

Nonlinearities generally occur in the trace of the electron beam across a target of the cathode ray device 10. For example, in television receiving apparatus utilizing the known horizontal reaction scanning arrangement, the tracing electron beam is generally subjected to stretching at the initiation of trace and to compression at the termination of trace. In the arrangement of FIGURE 1, this form of raster distortion may be reduced on a side of the raster by locating the magnetic bias points 82 and 84 of FIGURES 9 and 10 respectively along the hysteresis curves for utilizing the nonlinear characteristic of the curve in correcting the distortion. The magnetic bias point, as indicated previously, may be varied by varying the current $I_1$. Alteration of the bias flux provides an additional feature in that the width of the raster is varied when the amplitude of the flux is altered. The adjustable resistance 42 of FIGURE 1 therefore represents a convenient width control.

Figure 13:
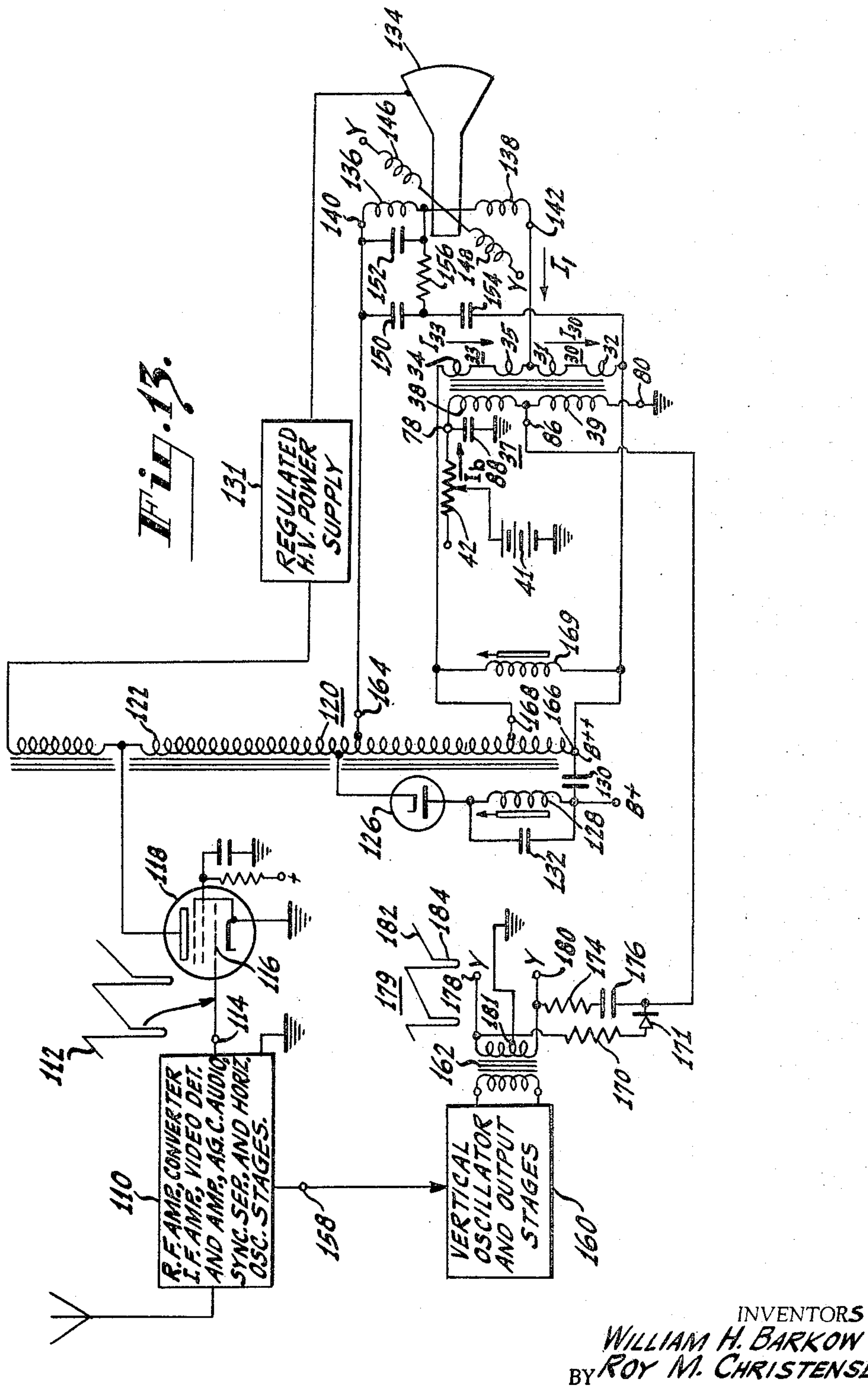
FIGURE 13 is a circuit diagram, partly in block and partly in schematic form, of a television receiving apparatus utilizing an embodiment of the present invention.

In FIGURE 13, a television receiving apparatus employing an embodiment of the present invention is illustrated. The television apparatus includes a radio frequency amplifier stage, a converter stage, an intermediate frequency amplifier stage, video detector and video amplifier stages, audio detector and audio amplifier stages, an automatic gain control stage, a synchronizing signal separator stage, and automatic frequency control and horizontal oscillator stages. These stages are conventional and are represented by the block 110. A horizontal deflection signal of frequency $f_1$ and having a waveform 112 (FIGURE 13) is generated by the horizontal oscillator stage and is provided at an output terminal 114 of this stage. This signal is coupled to a control electrode 116 of an amplifying device 118 in a horizontal output stage. The output stage includes an autotransformer, indicated generally as 120, having a winding 122, and a conventional efficiency circuit including an efficiency diode 126, a linearity inductor 128, a B+ boost capacitor 130, and a linearity capacitor 132. A circuit arrangement for providing a relatively high accelerating voltage is indicated by the block 131. Although not limited to such a supply, it will be apparent to those skilled in the art that the present invention is particularly useful with a form of regulated high voltage supply. A deflection yoke for the apparatus is positioned about a neck of a picture tube 134 and includes horizontal deflection windings 136 and 138, having terminals 140 and 142 respectively, for deflecting an electron beam in a horizontal direction. The yoke also includes vertical deflection windings 146 and 148 for deflecting an electron beam in a vertical direction. A circuit arrangement comprising capacitors 150, 152, 154 and a resistor 156 is provided for balancing the horizontal yoke windings. The signal 112 and the output circuit causes a current at a conventional deflection rate and of sawtooth waveform to flow in the horizontal deflection winding.

A separated vertical synchronizing pulse is provided at an output terminal 158 of the stages 110 and is coupled to conventional vertical oscillator and output stages represented by the block 160. The vertical output stage is coupled by a vertical output transformer 162 to the vertical deflection windings 146 and 148 for causing a current at a conventional vertical deflection rate and of sawtooth waveform to flow in the vertical deflection windings.

In reducing pincushion or barrel distortion, a correction circuit is coupled to the transformer winding 122 (FIGURE 13) and to the horizontal deflection windings. Elements of this correction circuit are similar to the elements of the correction circuit of FIGURE 1 and of FIGURE 4 and bear similar reference numerals. In the arrangement of FIGURE 13, the terminal 140 of the deflection winding 136 is coupled to a terminal 164 of the transformer winding and a terminal 142 of deflection winding 138 is coupled through the inductance 30 to a terminal 166 of the transformer winding. The correction circuit windings 34, 35, 31, and 32 are coupled between the terminal 166 and a terminal 168 on the transformer winding which is electrically intermediate the terminals 166 and 164. In FIGURE 13, the inductances 30 and 33 are shown coupled in parallel with a conventional raster width control inductance 169. The inductance 30 is thus coupled in series with the horizontal deflection windings 136 and 138 while the inductance 33 is coupled in parallel with these windings through the segment of the winding 122 between the terminals 164 and 168.

A circuit arrangement which comprises a source of control current $I_c$ and which is described in concurrently filed application of Eugene Lemke, Ser. No. 393,294, includes a resistor 170 and a diode 171 in one branch connected to terminal 178 of the vertical output transformer 162; and a resistor 174 and a capacitor 176 in another branch connected to terminal 180 of the transformer 162. Transformer 162 is provided with an additional terminal 181, which is returned directly to ground; terminal 181 is asymmetrically positioned intermediate the end terminals 178 and 180 of transformer 162. A voltage having a waveform indicated generally as 179 (FIGURE 13) is generated in the secondary winding of the transformer 162 between terminals 178 and 181; an opposite polarity version of the waveform 179 (of lessened magnitude, as determined by the asymmetry of position of the grounded terminal 181) is generated in the secondary winding between terminals 180 and 181.

The diode 171 is polarized so as to pass only an end-of-scan portions of a ramp segment 182 of the waveform 179 to the terminal 86 of the correction circuit. The diode 171 blocks the passage of the negative going retrace pulse segment 184, as well as a beginning-of-scan portion of the ramp segment 182. Beginning-of-scan energy is passed to terminal 86 of the correction circuit via the resistor 174 capacitor 176 path; the contribution of this latter path essentially comprises a somewhat delayed and flattened positive-going retrace pulse.

The composite voltage waveform appearing at terminal 86 of the correction circuit due to the contribution of the two paths noted above, is effectively integrated by the highly inductive correction winding 37 to cause an essentially parabolic control current to flow in the winding 37. The remaining elements of FIGURE 13 function in a manner similar to that previously described for the circuit of FIGURE 1, whereby further elaboration is believed unnecessary.

Figure 14:
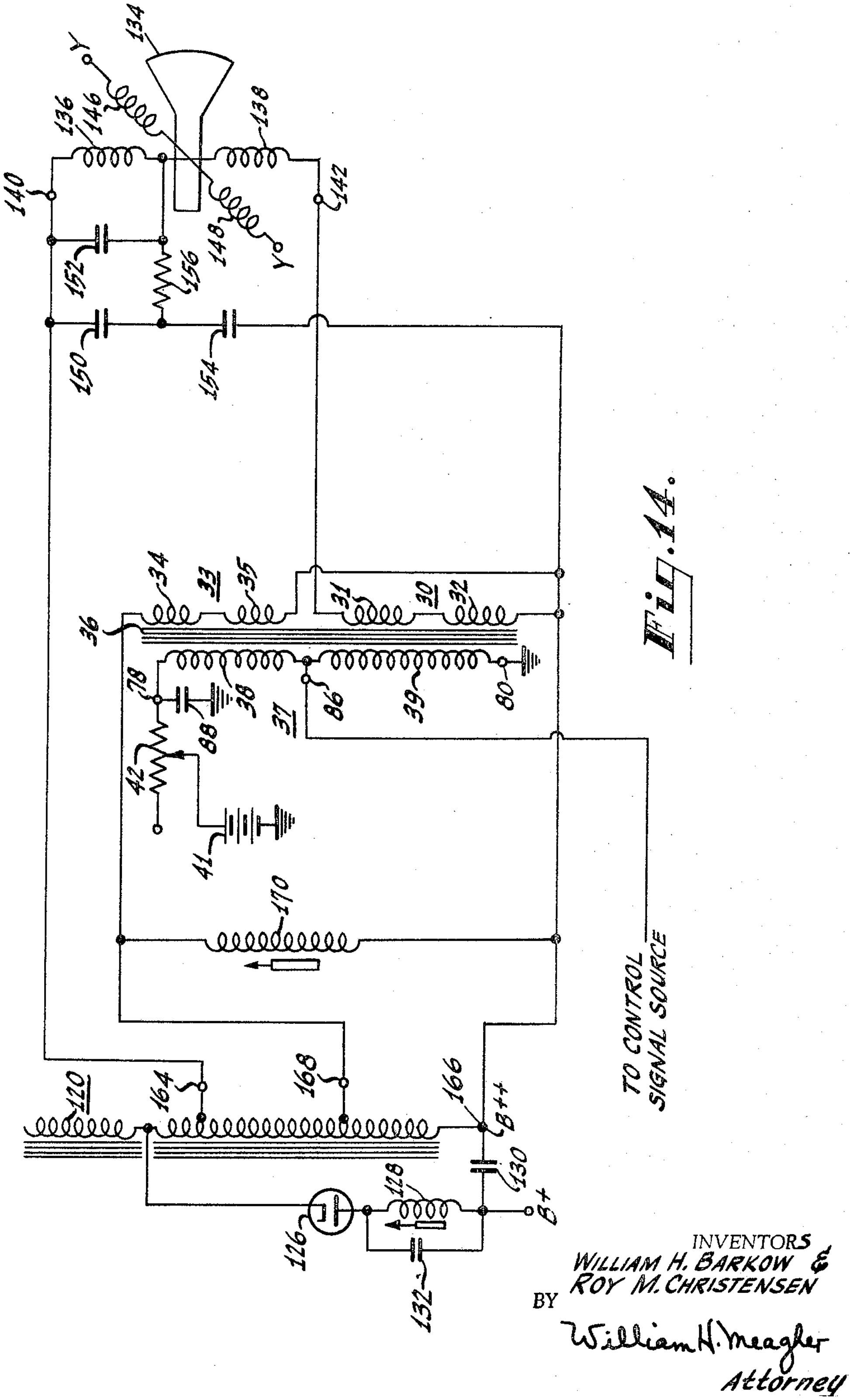
FIGURE 14 is a circuit diagram illustrating another embodiment of the invention.

FIGURE 14 illustrates an alternate arrangement of the raster correction circuit of FIGURE 13. Only those components of FIGURE 13 are illustrated in FIGURE 14 which are believed necessary for an understanding of this alternate embodiment of the invention. Similar components are identified by similar reference numerals. In the arrangement of FIGURE 13 the inductance 30 is coupled in series with the deflection windings 136 and 138 and also is coupled in series with the inductance 33 and, hence, the current $I_{30}$ flowing in the inductance 30 is the sum of the currents $I_1$ and $I_{33}$. At times, it may be advantageous to provide an inductance 30 which is series coupled only to the deflection winding. In FIGURE 14 such an arrangement is illustrated wherein the terminal of winding 35 (which, in the circuit of FIGURE 13, is coupled to the deflection winding terminal 142) is coupled instead to the terminal 166 and the terminal of the winding 31 (which, in the circuit of FIGURES 13, is coupled to the one terminal of winding 35 and to the deflection winding terminal 142) is coupled instead only to the deflection winding terminal 142.

Figure 15:
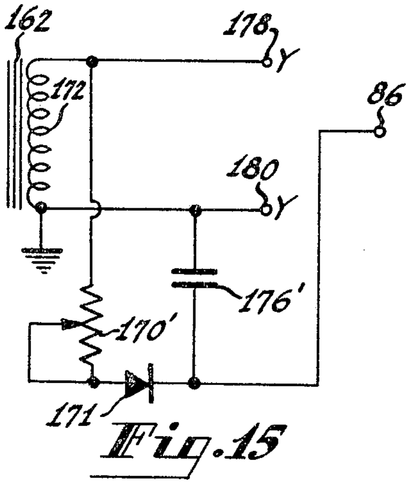
FIGURES 15 and 16 are fragmentary circuit diagrams illustrating other embodiments of driving circuits for the reactor.

FIGURE 15 shows a modified circuit arrangement for driving or energizing the control winding 37 of the reactor shown in FIGURE 13. It differs from the driving circuit shown in FIGURE 13 in several respects. The secondary winding 172 of transformer 162 is not provided with a grounded intermediate terminal in the FIGURE 15 circuit; rather, end terminal 180 is grounded. Diode 171 passes a portion of the ramp segment 182 of voltage waveform 179 (FIGURE 13), and blocks the passage of the negative going retrace pulse segment 184; a variable resistor 170' is connected in series with the diode 171 and provides a control for varying the magnitude of the control current traversing windings 37. The value of capacitor 176', which is connected between terminal 86 of the correction circuit and the grounded transformer terminal 180, is chosen so as to resonate the control winding 37 during the occurrence of the negative going retrace pulse segment 184, when terminal 86 of the control winding is uncoupled from the transformer 162 by the rendering of diode 171 nonconducting.

Figure 16:
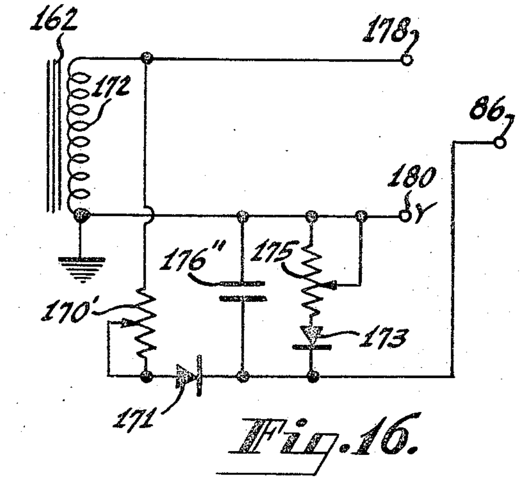

FIGURE 16 shows another form of control winding driving circuit which is similar to that shown in FIGURE 15 and includes a diode 173 connected in series with a variable resistor 175 from the terminal 86 on the control winding 37 of FIGURE 13 to ground. The purpose of these added circuit elements is to provide a somewhat improved wave shaping of the generally parabolic control current wave $I_c$. The added elements function to provide this facility in the following manner: When the diode 171 is rendered nonconducting to uncouple the terminal 86 from the vertical output transformer winding 172, as previously described, the diode 173 is rendered conducting, thereby operating in conjunction with the resistor 175 to damp the oscillation engendered by resonating the control winding. In such an arrangement the capacitor 176'' need not be as large as the capacitor 176' in the previously described FIGURE 15 arrangement. Also the circuit provides a greater facility for obtaining the desired shaping of the current $I_c$ for the control winding 37.

A number of circuit arrangements have thus been described for providing raster distortion correction while advantageously maintaining a substantially constant load on a driving circuit for a deflection winding.

While there has been illustrated, described, and pointed out in the annexed claims, certain novel features of the invention, it will be understood that certain variations, omissions, and substitutions in the forms and details of the system illustrated may be made by those skilled in the art without departing from the spirit of the invention and the scope of the claims.

What is claimed is:

1. A circuit arrangement for deflecting an electron beam in a cathode ray device of a television apparatus comprising:
   an electron beam deflection winding for deflecting an electron beam in a first direction;
   a first impedance coupled in series with said winding;
   a second impedance coupled in parallel with said winding;
   means for causing a cyclically varying current of frequency $(f_1)$ to flow in said winding;
   means for cyclically deflecting the electron beam in a second direction at a frequency $(f_2)$; and
   means for automatically varying the magnitude of said first and second impedances in an opposite manner during a deflection cycle of frequency $(f_2)$.

2. A circuit arrangement for deflecting an electron beam in a cathode ray device of a television apparatus comprising:
   an electron beam deflection winding for deflecting an electron beam in a first direction;
   a first reactive impedance coupled in series with said winding;
   a second reactive impedance coupled in parallel with said winding;
   means for causing a cyclically varying current of frequency $(f_1)$ to flow in said winding;
   means for cyclically deflecting the electron beam in a second direction at a frequency $(f_2)$; and
   means coupled to said reactive impedances for causing said first impedance to automatically increase in magnitude and said second impedance to automatically and simultaneously decrease in magnitude during a deflection cycle of frequency $(f_2)$.

3. A circuit arrangement for deflecting an electron beam in a cathode ray device of a television apparatus comprising:
   an electron beam deflection winding for deflecting an electron beam in a first direction;
   a first inductance coupled in series with said winding;
   a second inductance coupled in parallel with said winding;
   means for causing a cyclically varying current of frequency $(f_1)$ to flow in said winding;
   means for cyclically deflecting the electron beam in a second direction at a frequency $(f_2)$; and
   means, including a body of magnetic material of variable permeability, for causing said first inductance to automatically vary in magnitude and said second inductance to automatically and simultaneously vary in magnitude in an opposite manner during a deflection cycle of frequency $(f_2)$.

4. A circuit arrangement for deflecting an electron beam in a cathode ray device of a television apparatus comprising:
   an electron beam deflection winding for deflecting an electron beam in a first direction;
   a body of ferromagnetic material having a plurality of flux paths;
   a first inductance coupled in series with said deflection winding and having a winding thereof disposed in a first of said flux paths;
   a second inductance coupled in parallel with said deflection winding and having a winding thereof disposed in a second of said flux paths;
   means for causing a cyclically varying current of frequency $(f_1)$ to flow in said deflection winding;
   means for cyclically deflecting the electron beam in a second direction at a frequency $(f_2)$; and
   means for causing a magnetic bias flux to exist in said flux paths and for automatically varying the magnitude of a flux in said first flux path and for automatically and simultaneously varying the magnitude of a flux in said second flux path in an opposite manner during a deflection cycle of frequency $(f_2)$.

5. A circuit arrangement for deflecting an electron beam in a cathode ray device of a television apparatus comprising:
   an electron beam deflection winding for deflecting an electron beam in a first direction;
   a first body of ferromagnetic material defining a magnetic flux path;
   a second body of ferromagnetic material defining a magnetic flux path;
   a first inductance coupled in series with said deflection winding and having a winding thereof disposed in the flux path of said first body;
   a second inductance coupled in parallel with said deflection winding and having a winding thereof disposed in the flux path of said second body;
   means for causing a cyclically varying current of frequency $(f_1)$ to flow in said deflection winding;
   means for cyclically deflecting the electron beam in a second direction at a frequency $(f_2)$; and
   means for causing a magnetic bias flux to exist in said flux paths of said first and second bodies and for automatically varying the magnitude of the flux in said first body and for automatically and simultaneously varying the magnitude of flux in said second body in an opposite manner during a deflection cycle of frequency $(f_2)$.

6. A circuit arrangement for deflecting an electron beam in a cathode ray device of a television apparatus comprising:
   an electron beam deflection winding for deflecting an electron beam in a first direction;
   a body of magnetic material of variable permeability;
   a first inductance coupled in series with said deflection winding and having a winding thereof positioned about a first segment of said body;

a second inductance coupled in parallel with said deflection winding and having a winding thereof positioned about a second segment of said body;

means for causing a cyclically varying current of frequency ($f_1$) to flow in said deflection winding;

means for cyclically deflecting the electron beam in a second direction at a relatively lower frequency ($f_2$);

means for establishing a magnetic bias flux in segments of said body; and means including a control winding positioned about a segment of said body for causing a flux in said first and second body segments to automatically and simultaneously vary in magnitude in an opposite manner during a deflection cycle of frequency ($f_2$).

7. A circuit arrangement for deflecting an electron beam in a cathode ray device of a television apparatus comprising:

an electron beam deflection winding for deflecting an electron beam in a first direction;

a body of magnetic material of variable permeability;

a first inductance coupled in series with said deflection winding and having a winding thereof positioned about a first segment of said body;

a second inductance coupled in parallel with said deflection winding and having a winding thereof positioned about a second segment of said body;

means for causing a cyclically varying current of frequency ($f_1$) to flow in said deflection winding;

means for cyclically deflecting the electron beam in a second direction at a relatively lower frequency ($f_2$);

adjustable means for establishing a magnetic bias flux in segments of said body; and means including a control winding positioned about a segment of said body for causing a flux in said first and second body segments to automatically and simultaneously vary in magnitude in an opposite manner during a deflection cycle of frequency ($f_2$).

8. A circuit arrangement for deflecting an electron beam in a cathode ray device of a television apparatus comprising:

an electron beam deflection winding for deflecting an electron beam in a first direction;

a body of ferromagnetic material;

a first inductance coupled in series with said deflection winding and having a winding thereof positioned about said body;

a second inductance coupled in parallel with said deflection winding and having a winding thereof positioned about said body;

a control winding positioned about said body;

means for causing a cyclically varying current of frequency ($f_1$) to flow in said deflection winding;

means for cyclically deflecting the electron beam in a second direction at a relatively lower frequency ($f_2$);

a source of direct current potential coupled to said control winding; and a source of current of varying amplitude coupled to said control winding.

9. A circuit arrangement for deflecting an electron beam in a cathode ray device of a television apparatus comprising:

an electron beam deflection winding for deflecting an electron beam in a first direction;

a first body of ferromagnetic material defining a magnetic circuit having a two-window configuration;

a second body of ferromagnetic material defining a magnetic circuit of two-window configuration;

a first inductance coupled in series with said deflection winding and having a winding thereof positioned about a segment of said first body;

a second inductance coupled in parallel with said deflection winding and having a winding thereof positioned about a segment of said second body;

a control winding positioned about a segment of said first body and about a segment of said second body;

means for causing a cyclically varying current of frequency ($f_1$) to flow in said deflection winding;

means for cyclically deflecting the electron beam in a second direction at a relatively lower frequency ($f_2$);

a source of direct current potential coupled to said control winding; and a source of current of varying amplitude coupled to said control winding.

10. A circuit arrangement for deflecting an electron beam in a cathode ray device of a television apparatus comprising:

an electron beam deflection winding for deflecting an electron beam in a first direction;

a body of ferromagnetic material of variable permeability defining a magnetic circuit of four-window configuration and having a segment in each window which is arranged physically independent of segments of adjacent windows, and a segment in each window which is common with a segment of an adjacent window;

a first inductance coupled in series with said deflection winding and having first and second series coupled windings thereof positioned respectively about an independent segment of a first window and an independent segment of a second window;

a second inductance coupled in parallel with said deflection winding and having third and fourth series coupled windings thereof positioned respectively about an independent segment of a third window and an independent segment of a fourth window;

means for causing a cyclically varying current of frequency ($f_1$) to flow in said deflection winding;

means for cyclically deflecting the beam in a second direction at a relatively lower frequency ($f_2$);

a control winding positioned about a body segment common to the first and second windows and about a body segment common to the third and fourth windows;

said control winding polarized for causing a flux in said first and second body segments to automatically vary in magnitude and a flux in said third and fourth window segments to simultaneously vary in magnitude in an opposite manner with respect to the flux variation in said first and second segments when a control current flows in said control winding;

means for applying a direct current potential to said control winding for establishing a bias flux in said body; and means for applying an electrical signal to said control winding for causing a control current of varying amplitude to flow in said control winding during a deflection cycle of frequency ($f_2$).

11. A circuit arrangement for deflecting an electron beam in a cathode ray device of a television apparatus comprising:

an electron beam deflection winding for deflecting an electron beam in a first direction;

a body of ferromagnetic material defining a magnetic circuit of four-window configuration and having a segment in each window which is arranged physically independent of segments of adjacent windows and forming a path for magnetic flux, and a segment in each window which is common with a segment of an adjacent window and forming a path for magnetic flux;

said magnetic material having a magnetization characteristic including a knee segment defining a transition region between a region of relatively high permeability and a region of relatively low permeability;

a first inductance coupled in series with said deflection winding and having first and second series coupled windings thereof positioned respectively about an independent segment of a first window and an independent segment of a second window;

a second inductance coupled in parallel with said deflection winding and having third and fourth series coupled windings thereof positioned respectively about an independent segment of a third window and an independent segment of a fourth window;

means for causing a cyclically varying current of frequency ($f_1$) to flow in said deflection winding;

means for cyclically deflecting the beam in a second direction at a relatively lower frequency ($f_2$);

a control winding positioned about said first and second common body window segments;

said control winding polarized for causing a flux in said first and second body segments to automatically vary in magnitude and a flux in said third and fourth window segments to simultaneously vary in magnitude in an opposite manner with respect to the flux variation in said first and second segments when a control current flows in said control winding;

means for establishing a flux in said body of a magnitude for biasing said first, second, third, and fourth independent body segments at the knee segment of said magnetization characteristic; and means for applying an electrical signal to said control winding for causing a control current of varying magnitude to flow in said control winding during a deflection cycle of frequency ($f_2$).

12. A circuit arrangement for deflecting an electron beam in a cathode ray device of a television receiver comprising:

a yoke having horizontal and vertical deflection windings for deflecting an electron beam of said device in mutually perpendicular directions when currents of sawtooth waveform flow therein;

a body of ferromagnetic material of variable permeability having a plurality of segments forming flux paths in said body;

a first inductance coupled in series with said horizontal deflection winding and having a winding thereof positioned about a first segment of said body;

a second inductance coupled in parallel with said horizontal deflection winding and having a winding thereof positioned about a second segment of said body;

deflection circuit means including an output transformer coupled to said horizontal deflection winding for causing a deflection current of sawtooth waveform to flow in said horizontal deflection winding;

means for causing a cyclical vertical deflection current to flow in said vertical deflection winding;

a control winding positioned about segments of said body;

said control winding polarized for causing a flux of varying magnitude to automatically flow in said first segment and a flux which simultaneously varies in magnitude in an opposite manner to flow in said second body segment when a control current flows in said control winding;

means for applying a direct current potential to said control winding for establishing a bias flux in said body; and means for applying an electrical signal to said control winding for causing a control current of varying amplitude to flow in said control winding during a vertical deflection cycle.

13. A circuit arrangement for deflecting an electron beam in a cathode ray device of a television receiver comprising:

a yoke having horizontal and vertical deflection windings for deflecting an electron beam in mutually perpendicular directions when currents of sawtooth waveform flow therein;

a body of ferromagnetic metarial defining a magnetic circuit of a four-window configuration and having a segment in each window which is arranged physically independent of segments of adjacent windows and forming a path for magnetic flux and a segment in each window which is common with a segment of an adjacent window and forming a path for magnetic flux;

said magnetic material having a magnetization characteristic including a knee segment defining a transition region between regions of relatively high and relatively low permeability;

a first inductance having first and second series coupled windings thereof positioned respectively about an independent segment of a first window and an independent segment of a second window;

a second inductance having third and fourth series coupled windings thereof positioned respectively about an independent segment of a third window and an independent segment of a fourth window;

a horizontal output circuit including a transformer having a winding for generating a deflection current of sawtooth waveform in said horizontal deflection winding;

means series coupling said first inductance and said horizontal deflection winding across a segment of said transformer winding;

means coupling said second inductance across said output transformer winding segment;

a control winding including first and second windings thereof positioned respectively about first and second common body window segments;

said control windings polarized for causing a flux of varying magnitude to flow in said independent segments of said first and second windows and a flux, having a magnitude varying in an opposite manner, to flow in said third and fourth segments when a control current of varying magnitude flows in said control winding;

means applying a direct current voltage to said control winding in a manner for establishing a flux in said body for biasing said first, second, third and fourth independent segments of said body at said knee on said magnetization characteristic; and means for causing a current of parabolic waveform to flow in said control windings during a vertical deflection cycle.

14. A circuit arrangement for deflecting an electron beam in a cathode ray device of a television receiver comprising:

a yoke having horizontal and vertical deflection windings for deflecting an electron beam in mutually perpendicular directions when currents of sawtooth waveform flow therein;

a body of ferromagnetic material defining a magnetic circuit of a four-window configuration and having a segment in each window which is arranged physically independent of segments of adjacent windows and forming a path for magnetic flux and a segment in each window which is common with a segment of an adjacent window and forming a path for magnetic flux;

said magnetic material having a magnetization characteristic including a knee segment defining a transition region between regions of relatively high and relatively low permeability;

a first inductance having first and second series coupled windings thereof positioned respectively about an independent segment of a first window and an independent segment of a second window;

a second industance having third and fourth series coupled windings thereof positioned respectively about an independent segment of a third window and an independent segment of a fourth window;

a horizontal output circuit including a transformer having a winding for generating a deflection current of sawtooth waveform in said horizontal deflection winding;

means series coupling said first inductance and said horizontal deflection winding across a segment of said transformer winding;

means coupling said second inductance across said output transformer winding segment;

a control winding including first and second windings thereof positioned respectively about first and second common body window segments;

said control windings polarized for causing a flux of varying magnitude to flow in said independent segments of said first and second windows and a flux, having a magnitude varying in an opposite manner, to flow in said third and fourth segments when a control current of varying magnitude flows in said control winding;

means applying a direct current voltage to said control winding in a manner for establishing a flux in said body for biasing said first, second, third and fourth independent segments of said body at said knee on said magnetization characteristic; and means for causing a current of sawtooth waveform to flow in said control windings during a vertical deflection cycle.

15. A circuit arrangement for deflecting an electron beam in a cathode ray device of a television receiver comprising:

a yoke having horizontal and vertical deflection windings for deflecting an electron beam in mutually perpendicular directions when currents of sawtooth waveform flow therein;

a body of ferromagnetic material defining a magnetic circuit of a four-window configuration and having a segment in each window which is arranged physically independent of segments of adjacent windows and forming a path for magnetic flux and a segment in each window which is common with a segment of an adjacent window and forming a path for magnetic flux;

said magnetic material having a magnetization characteristic including a knee segment defining a transition region between regions of relatively high and relatively low permeability;

a first inductance having first and second series coupled windings thereof positioned respectively about an independent segment of a first window and an independent segment of a second window;

a second inductanec having third and fourth series coupled windings thereof positioned respectively about an independent segment of a third window and an independent segment of a fourth window;

a horizontal output circuit including a transformer having a winding for generating a deflection current of sawtooth waveform in said horizontal deflection winding;

means coupling said first inductance and said horizontal deflection winding in series across a segment of said transformer winding;

means coupling said second inductance between said horizontal deflection winding and an intermediate point on said output transformer winding segment;

a control winding including first and second windings thereof positioned respectively about first and second common body window segments;

said control windings polarized for causing a flux of varying magnitude to flow in said independent segments of said first and second windows and a flux, having a magnitude varying in an opposite manner, to flow in said third and fourth segments when a control current of varying magnitude flows in said control winding;

means applying a direct current voltage to said control winding in a manner for establishing a flux in said body for biasing said first, second, third and fourth independent segments of said body at said knee on said magnetization characteristic; and means coupling said second inductance across said segment of said transformer winding;

means for causing a current of parabolic waveform to flow in said control windings during a vertical deflection cycle.

16. A circuit arrangement for deflecting an electron beam in a cathode ray device of a television receiver comprising:

a yoke having horizontal and vertical deflection windings for deflecting an electron beam in mutually perpendicular directions when currents of sawtooth waveform flow therein;

a body of magnetic material defining a magnetic circuit of four-window configuration and having a segment in each window which is arranged physically independent of segments of adjacent windows and forming a path for magnetic flux, and a segment in each window which is common with a segment of an adjacent window and forming a path for magnetic flux;

said magnetic material having a magnetization characteristic including a knee segment defining a transition region between regions of relatively high and relatively low permeability;

a first inductance having first and second series coupled windings thereof positioned respectively about an independent segment of a first window and an independent segment of a second window;

a second inductance having third and fourth series coupled windings thereof positioned respectively about an independent segment of a third window and an independent segment of a fourth window;

a horizontal output circuit including a transformer having a winding thereof for generating a deflection current of sawtooth waveform;

means coupling said first inductance in series between a first terminal of asid horizontal deflection winding and a first terminal of said output transformer winding.

means coupling a second terminal of said horizontal deflection winding to a second terminal of said horizontal output transformer winding;

means coupling said second inductance between said first terminal of said horizontal deflection winding and said horizontal output transformer winding at a point on the winding electrically intermediate said first and second transformer winding terminals;

means for applying a deflection current of sawtooth waveform to said vertical deflection winding;

a control winding including first and second series connected windings positioned respectively about first and second common window segments;

means for causing a direct current to flow in said first and second control windings for biasing said independent segments at said knee segment; and means for applying a signal of parabolic waveform to said first and second control winding.

References Cited

UNITED STATES PATENTS

| | | | |
|---|---|---|---|
| 2,842,709 | 7/1958 | Lufkin | 315—24 |
| 2,906,919 | 9/1959 | Thor et al. | 315—24 |

DAVID G. REDINBAUGH, *Primary Examiner.*

T. A. GALLAGHER, *Assistant Examiner.*